United States Patent
Ahlstedt et al.

(10) Patent No.: US 9,470,512 B2
(45) Date of Patent: Oct. 18, 2016

(54) PRE-FORMED OPTICAL MEANDER STRUCTURES FOR USE IN AN OPTICAL STRAIN GAUGE SYSTEM FOR MEASURING STRAIN, AND A METHOD

(71) Applicant: Avago Technologies General IP (Singapore) Pte. Ltd., Singapore (SG)

(72) Inventors: Magnus Ahlstedt, Regensberg (DE); Dawid Janse Van Vuuren, Pentling (DE); Ralf Mueller, Regenstauf (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/338,308

(22) Filed: Jul. 22, 2014

(65) Prior Publication Data
US 2016/0025483 A1    Jan. 28, 2016

(51) Int. Cl.
G01B 11/16    (2006.01)
(52) U.S. Cl.
CPC .................... *G01B 11/18* (2013.01)
(58) Field of Classification Search
CPC ................. G01B 11/18; G01N 27/44721
USPC ............................. 73/800, 862.624
See application file for complete search history.

(56) References Cited

U.S. PATENT DOCUMENTS

| 5,012,679 | A | * | 5/1991 | Haefner | ................ | G01L 1/243 |
|---|---|---|---|---|---|---|
| | | | | | | 356/32 |
| 5,926,584 | A | * | 7/1999 | Motzko | ................ | G01L 1/245 |
| | | | | | | 250/227.14 |
| 2005/0184885 | A1 | * | 8/2005 | Tervonen | .............. | G06F 1/1626 |
| | | | | | | 341/31 |
| 2007/0193362 | A1 | | 8/2007 | Ferguson | | |
| 2007/0196632 | A1 | | 8/2007 | Meyer, Jr. et al. | | |
| 2010/0232740 | A1 | | 9/2010 | Schilling et al. | | |

OTHER PUBLICATIONS

Kara Peters, Sharon Kiesel, Omid Abdi, Tasnim Hassan, Mervyn Kowalsky, "Intrinsic Polymer Optical Fibers for Large Deformation Strain Sensors," SPIE Newsroom, Mar. 3, 2008, 4 pages.
"Polymer Optical Fibre," AMS Technologies, Feb. 19, 2014, 6 pages.
"50 Meters of Optical Fiber Shrunk to the Size of Microchips," DARPA, Nov. 28, 2013, 3 pages.

* cited by examiner

*Primary Examiner* — Max Noori

(57) ABSTRACT

An optical fiber strain sensor system and method are provided that use pre-formed optical structures instead of optical fibers for measuring the strain, or stress, placed on a subject object. The use of pre-formed optical structures in the optical strain gauge system eliminates many of the limitations associated with the use of optical fibers. Because the optical structures are pre-formed structures, they can be made with very tight tolerances to ensure high measurement accuracy and repeatability. The pre-formed structures can be made in low to high volume at low cost and can be made of a variety of materials to ensure that the structures are suitable for use with the material of which the subject object is made. Also, the pre-formed structures can be made very compact while achieving higher sensitivity and exhibiting less optical loss than fiber.

26 Claims, 9 Drawing Sheets

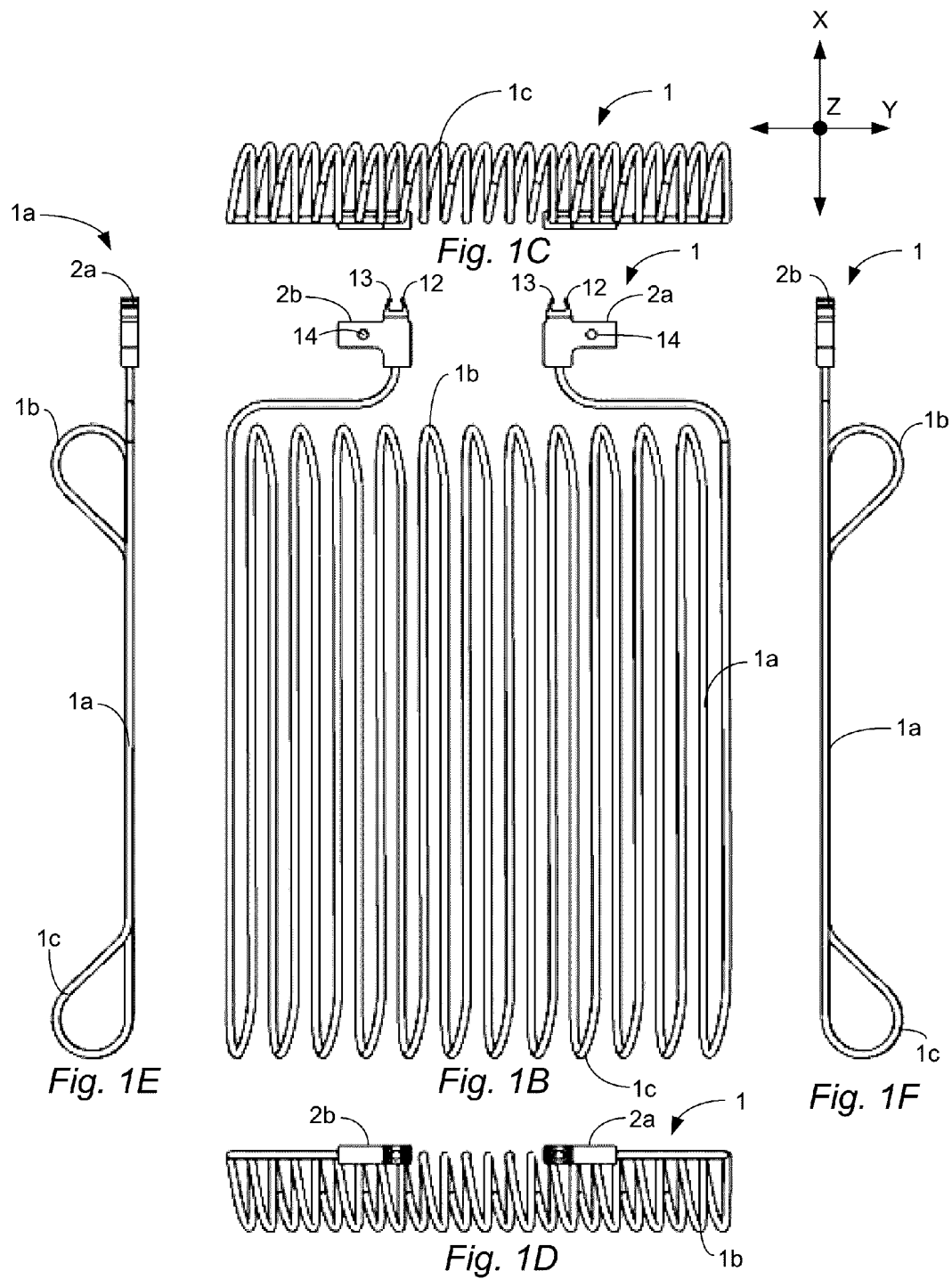

PRE-FORMED OPTICAL MEANDER STRUCTURES FOR USE IN AN OPTICAL STRAIN GAUGE SYSTEM FOR MEASURING STRAIN, AND A METHOD

TECHNICAL FIELD

The invention relates to optical strain gauge technology, and more particularly, to pre-formed optical meander structures for use in an optical strain gauge system for measuring strain.

BACKGROUND

In recent years, optical fibers have been used in optical strain gauge systems for sensing the strain, or stress, placed on a subject object. This technology is referred to as optical phase interrogation technology. U.S. Pat. No. 8,346,032 by Schilling, et al., which is assigned to the assignee of the present application, is directed to an optical strain gauge system used to perform optical phase interrogation to determine the strain that has been placed on a subject object. The subject object may be, for example, a concrete piling used in a building, a tower, a rotor blade of a windmill, or a wing of an airplane.

A portion of a strain-sensing fiber, which is typically a plastic optical fiber (POF), is embedded in or attached to the subject object. The embedded portion of the strain-sensing fiber is typically referred to as a meander of fiber. Typically, an adhesive material such as epoxy is used to attach the strain-sensing fiber to the subject object. The ends of the strain-sensing fiber are optically coupled to measurement equipment of the strain gauge system. A reference optical fiber that is identical to the strain-sensing fiber is typically laid alongside the strain-sensing fiber on or in the subject object. The ends of the reference fiber are also optically coupled to the measurement equipment.

A laser diode or a light emitting diode (LED) of the measurement equipment is modulated to produce a modulated light beam. An optical splitter of the measurement equipment splits the modulated light beam into first and second modulated light beams, which are then optically coupled into the first ends of the strain-sensing fiber and the reference fiber. The first and second modulated light beams propagate along the two fibers and pass out of the second ends of the fibers. The measurement equipment includes first and second optical sensors that receive the respective light beams and convert the respective light beams into respective electrical signals. Electrical circuitry of the measurement equipment processes the electrical signals to determine the phase difference between them. The phase difference is then used to determine the difference in the lengths of the two fibers. The extent of the elongation may be used to characterize the strain or stress that has been placed on the subject object, which, in turn, may be used for a number of reasons, such as to determine the integrity of the subject object.

In some cases, the strain-sensing fiber is embedded in a bulk matrix material. The bulk matrix material is either attached to the subject object or is integrated directly into the bulk material of the subject object. The strain that bulk matrix material is subjected to is transferred into the strain-sensing fiber. The phase difference between the signals passing out of the ends of the reference and strain-sensing fibers is determined and used to determine the extent of elongation of the strain-sensing fiber. The extent of the elongation is then used to characterize the strain or stress that has been placed on the subject object.

One of the limitations of this approach is that the bulk matrix material must be carefully chosen for the specific application for which the strain gauge system will be used. For example, physical characteristics of the bulk matrix material such as elastic modulus (E-modules) and coefficient of thermal expansion (CTE) need to be carefully chosen for each specific application to ensure that the bulk matrix material is suitable for use with the subject object. Another limitation of the strain gauge systems described above is that the minimum bend radius of the fibers is so large that the fiber meanders that are attached to the subject object are very large, which increases the size of the strain gauge and makes it unsuitable for use in small areas of a subject object. Also, the length of the fibers that are used in the strain gauge is limited by the minimum bend radius due to the increase in area that is used by a longer fiber meander having a bend radius that is equal to or greater than the minimum bend radius. This limitation in fiber length limits the sensitivity of the strain gauge system. The limitation in sensitivity can limit the accuracy of the strain measurements.

Another limitation of strain gauge systems that embed the strain-sensing fiber in a bulk matrix material is that repeatability is difficult due to the very tight tolerances that must be met in providing a suitable fiber and a suitable bulk matrix material and embedding the fiber in the bulk matrix material. In addition, some sensitivity is lost as the strain is transferred from the bulk matrix material to the fiber jacket, from the fiber jacket to the fiber cladding, and from the fiber cladding to the fiber core. Again, the loss in sensitivity can lead to inaccuracies or insensitivities in the strain measurements.

Accordingly, a need exists for a strain gauge system that is not limited in size by the minimum fiber bend radius and that can be very compact, that is highly sensitive to strain and very accurate, that can be easily made with very tight tolerances and with high repeatability, and that can be made in low to high volume at low costs.

SUMMARY

The invention is directed to a pre-formed optical meander structure for use in an optical strain gauge system and a method. The pre-formed optical meander structure comprises at least a first end, a second end and a first light guide extending from the first end of the meander structure to the second end of the meander structure. The first light guide has a first end and a second end and a plurality of light-guiding portions connected end-to-end in a predetermined configuration.

The method comprises attaching a strain gauge to the subject object where the strain gauge comprises a pre-formed optical meander structure, coupling a modulated optical strain-sensing signal of a first wavelength into a first end of the first light guide, coupling a modulated optical reference signal of the first wavelength into a first end of a second light guide, receiving the first modulated optical strain-sensing signal passing out of the second end of the first light guide and converting the modulated optical strain-sensing signal into a first electrical signal, receiving the first modulated optical reference signal passing out of the second end of the second light guide and converting the modulated optical reference signal into a second electrical signal, determining a phase difference between the first and second electrical signals, and, based on the phase difference, determining an amount of strain sensed by the strain gauge.

These and other features and advantages of the invention will become apparent from the following description, drawings and claims.

BRIEF DESCRIPTION OF THE DRAWINGS

FIGS. 1B-1F illustrate, respectively, top, front, left side, and right side views of the 3-D pre-formed optical meander structure shown in FIG. 1A.

DETAILED DESCRIPTION OF ILLUSTRATIVE EMBODIMENTS

Figure 1A:
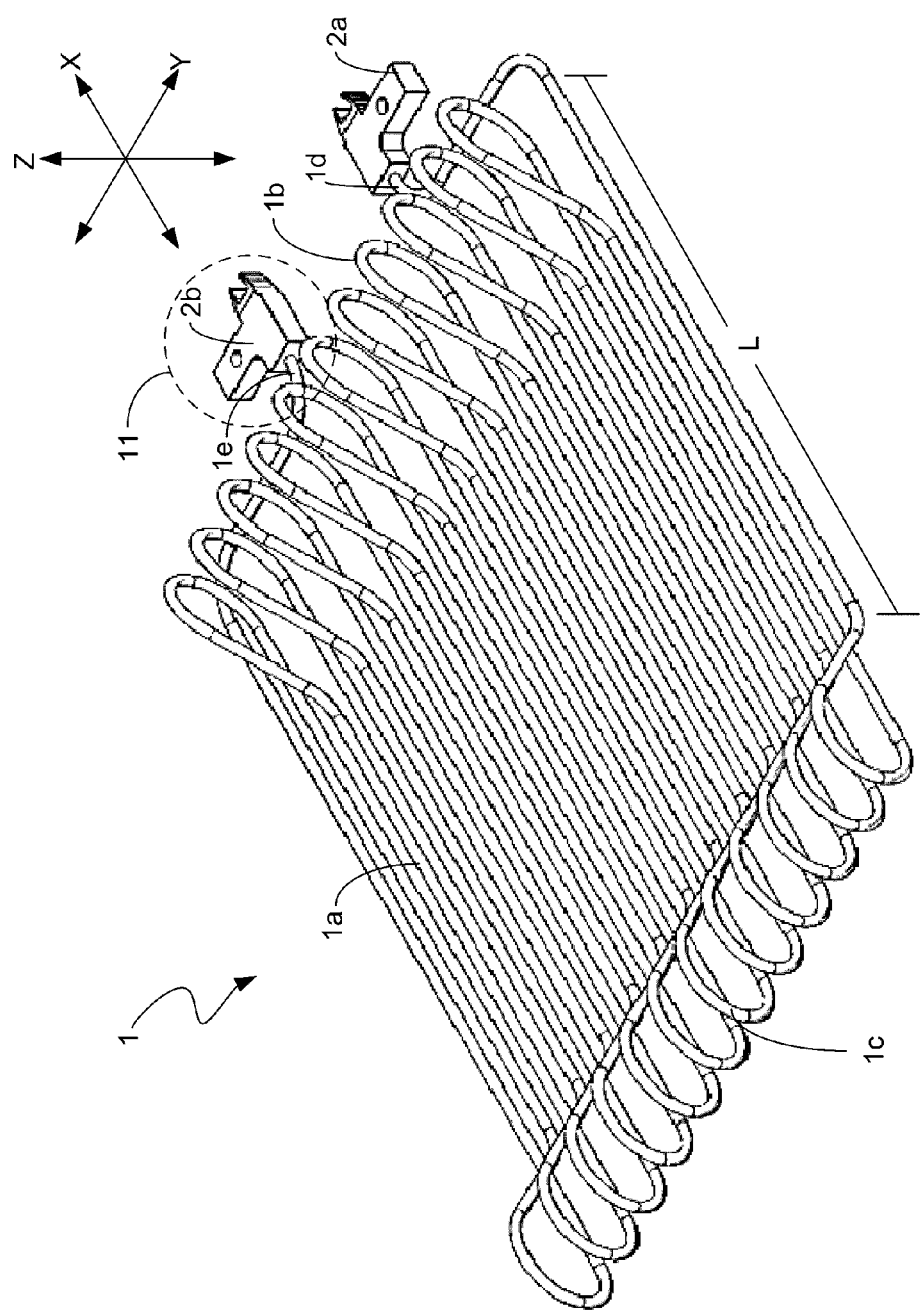
FIG. 1A illustrates a top perspective view of a 3-D pre-formed optical meander structure in accordance with an illustrative embodiment for use in an optical strain gauge system for measuring stress placed on a subject object (not shown).

In accordance with illustrative embodiments described herein, pre-formed optical meander structures are provided for use in an optical strain gauge system for measuring strain. The use of pre-formed optical meander structures in the optical strain gauge system eliminates many of the limitations associated with using optical fibers in optical strain gauge systems. The pre-formed structures can be made with very tight tolerances to ensure high measurement accuracy. In addition, the pre-formed optical structures can be made in volumes ranging from low to high volume at low cost and with repeatability. The pre-formed optical meander structures can be made of a variety of materials to ensure that the structures are suitable for use with the material of which the subject object is made.

Also, the pre-formed structures can be made three-dimensional (3-D) such that the bends in the meander of the pre-formed structure are located outside of the strain-sensing plane. By locating the bends outside of the strain-sensing plane, the portions of the meander that are located in the strain-sensing plane can be placed closer together, which means that the pre-formed structure can be made very compact while having a greater number of meanders in the strain-sensing plane and a longer light-guiding pathway. This, in turn, leads to better sensitivity in terms of strain-sensing ability and higher strain measurement resolution. Illustrative embodiments will now be described with reference to FIGS. 1-7, in which like reference numerals identify like elements, components or features. Features, elements and components in the drawings are not drawn to scale.

FIG. 1A illustrates a top perspective view of a 3-D pre-formed optical meander structure 1 in accordance with an illustrative embodiment for use in an optical strain gauge system for measuring stress placed on a subject object (not shown). FIGS. 1B-1F illustrate, respectively, top, front, left side, and right side views of the 3-D pre-formed optical meander structure 1 shown in FIG. 1A. The pre-formed optical meander structure 1 is typically formed by using an injection molding or compression molding technique, but other techniques such as 3-D printing, casting and milling, for example, may be used to form the meander structure 1. Such techniques are known in the art. It is also known that such techniques can be used to make structures out of a variety of materials with very tight tolerances and with repeatability, or reproducibility.

The meander structure 1 is a light guide comprising a plurality of straight light-guiding portions 1a interconnected by first and second loop light-guiding portions 1b and 1c, respectively. The meander structure 1 is totally internally reflective to light of an operating wavelength or of a range of operating wavelengths. First and second ends 1d and 1e of the meander structure 1 are terminated by first and second optical connectors 2a and 2b, respectively. The first and second optical connectors 2a and 2b are adapted, or configured, to mate with respective optical plugs or connectors (not shown) disposed on the ends of respective optical fibers (not shown). The opposite ends of those optical fibers are optically coupled to an optical strain sensor system that generates a modulated reference optical signal and a modulated strain-sensing optical signal and that later calculates a phase difference between the strain-sensing optical signal and the reference optical signal, as will be described below with reference to FIG. 5. The fiber that is connected to optical connector 2a receives the modulated strain-sensing optical signal to be coupled into the meander structure 1. The fiber that is connected to optical connector 2b receives the modulated strain-sensing optical signal being coupled out of the meander structure 1 and sends it to the optical strain sensor system described below with reference to FIG. 5.

In accordance with this illustrative embodiment, the optical connectors 2a and 2b are Versatile Link simplex optical connectors, which is a known type of optical simplex connector manufactured and sold by the assignee of the present application. However, the invention is not limited to using any particular type of optical connector with the pre-formed meander structure 1. In accordance with this illustrative embodiment, the optical plugs (not shown) that are disposed on the ends of the optical fibers for mating with the connectors 2a and 2b are Versatile Link optical simplex plugs, which are also manufactured and sold by the assignee of the present application. The optical connectors 2a and 2b may be integrally formed in or joined with the pre-formed meander structure 1 at the time that the pre-formed meander structure 1 is manufactured, or they may be separate parts that are joined to the ends 1d and 1e of the pre-formed meander structure 1 after it has been manufactured.

The pre-formed meander structure 1 may be made of a variety of materials including, for example, polymethylmethacrylate (PMMA), polycarbonate (PC), polyethylene (PE), polyvinyl chloride (PVC), clear epoxy, and glassy materials (e.g., silicon dioxide, sodium oxide, sodium carbonate, calcium oxide, and silicon-based materials). The material that is used for the meander structure 1 will have an elastic modulus that allows the straight light-guiding portions 1a to flex, or deform, by a predetermined amount when subjected to strain or stress and to be restored to their original shapes when the force is removed.

The straight light-guiding portions 1a are in a strain-sensing plane, which corresponds to the X-Y plane of the Cartesian coordinate system shown in FIGS. 1A-1F. The first and second loop light-guiding portions 1b and 1c, respectively, are in the X-Z plane of the Cartesian coordinate system, which is outside of the strain-sensing plane. The length, L, of the straight light-guiding portions 1a corresponds to the strain-sensing length of the meander structure 1. Locating the loop light-guiding portions 1b and 1c outside of the strain-sensing plane allows those portions 1b and 1c to have a radius that is greater than or equal to a minimum bend radius without having any effect on how close the straight light-guiding portions 1a are to one another. This feature allows the meander structure 1 to be very compact while also increasing the number of light-guiding portions 1a of the meander that are in the strain-sensing plane, which also allows the overall length of the light path of the meander structure 1 to be increased. Increasing the number of light-guiding portions 1a that are in the strain-sensing plane and increasing the overall length of the light path lead to better sensitivity in sensing stress and higher resolution in calculating the stress measurement based on the phase difference. In addition, all of these benefits can be realized while also making the structure 1 more compact.

It can be seen from FIG. 1A that if the loop light-guiding portions 1b and 1c were to be located in the X-Y plane along with the straight light-guiding portions 1a, then the spacing between the straight light-guiding portions 1a would have to be increased in order to provide a bend radius for portions 1b and 1c that is not less than the minimum bend radius. In optical fiber strain gauges, the entire fiber meander typically lies in a single plane, which is why the minimum bend radius of the fiber imposes limitations on sensitivity, resolution and size. The present invention eliminates this limitation by using a 3-D configuration for the meander structure 1 that positions the loop light-guiding portions 1b and 1c outside of the strain-sensing plane to allow the straight light-guiding portions 1a to be positioned closer to one another and/or to be increased in number.

The material that is chosen for the meander structure 1 will depend, at least in part, on the material of which the subject object is made and on the amount of strain that is expected to be placed on the portions 1a by the subject object. Different materials typically have different modulus's of elasticity. The stiffness, or conversely the flexibility, of a material is characterized by the modulus of elasticity of the material. The material that is used for the meander structure 1 will have characteristics of stiffness and flexibility that allow the straight light-guiding portions 1a to deform by an amount that depends on the amount of strain placed on the portions 1a by the subject object and to return to their original shapes when the strain is not present. It will be understood that over time the portions 1a may not be fully restored to their original shapes when strain is not present due to aging of the material, but should restore to approximately their original shapes when strain is not present. Also, if strain that is placed on the portions 1a is too large, the portions 1a may break or become permanently deformed.

Figure 2:
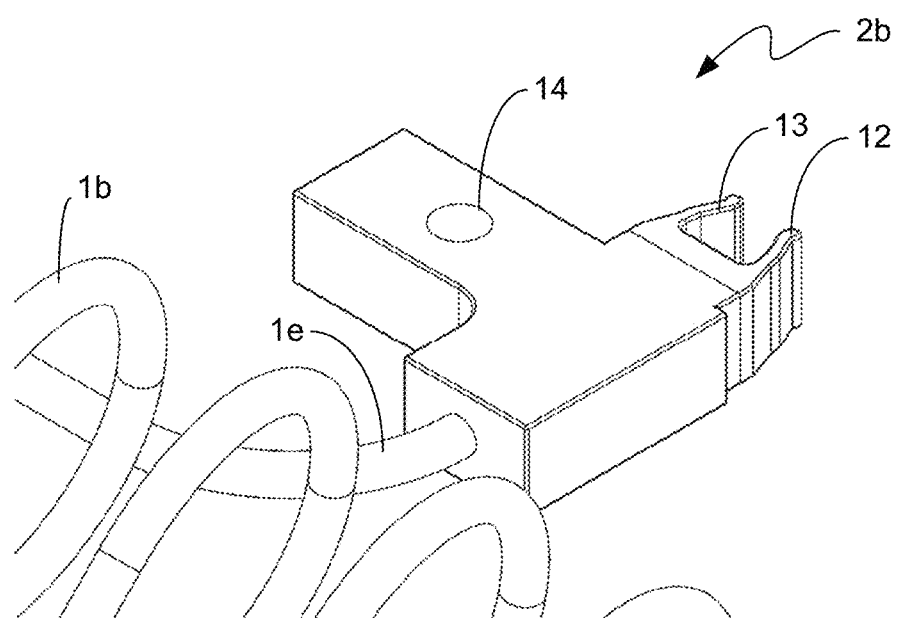
FIG. 2 illustrates an enlarged perspective view of the optical connector shown in the dashed circle labeled with reference numeral 11 in FIG. 1A.

FIG. 2 illustrates an enlarged perspective view of the optical connector 2b shown in the dashed circle labeled with reference numeral 11 in FIG. 1A. As indicated above, in accordance with this illustrative embodiment, the optical connector 2b is a Versatile Link simplex optical connector, although it could be any suitable connector. The connector 2b has arms 12 and 13 that are configured to grip a rib formed on a mating Versatile Link simplex optical plug (not shown). The manner in which such connectors mate with such plugs is well known. In accordance with this illustrative embodiment, the connector 2b has a thru-hole 14 formed therein through which a fastener such as a screw can be inserted for fastening the connector 2b to another device, such as the surface of a cured piece of bulk matrix material or the subject object. The structure of connector 2a is identical to the structure of connector 2b.

The optical connectors 2a and 2b may have additional functionality other than coupling light into and out of the pre-formed meander structure 1. For example, an optical splitter (not shown) may be incorporated into the connector 2a for splitting the modulated optical strain-sensing signal into first and second modulated optical signals. The first modulated optical signal may be the modulated optical strain-sensing signal and the second modulated optical signal may be the modulated optical reference signal.

In this example, the pre-formed meander structure would include a first meander for guiding the modulated optical strain-sensing signal and a second meander for guiding the modulated optical reference signal. The first meander could have a structure that is similar or identical to the structure 1 shown in FIGS. 1A-1F and the second meander could have a similar or identical structure to the first meander. The second meander could have a structure that is different from the structure of the first meander. The first and second meanders are respective light guides for guiding the respective modulated optical signals along predetermined light paths. The light path of the second meander could be the same length as the light path of the first meander or it could be different from the length of the light path of the first meander. If the structure of the second meander is not identical to the structure of the first meander or if the lengths of the light paths of the first and second meanders are not the same, a calibration process would need to be performed to determine the phase difference between the strain-sensing optical signal and the reference optical signal output from the meanders when the first meander structure is not being subjected to any strain. This phase difference is caused by the differences between the structures of the first and second meanders and/or by differences between the lengths of the light paths of the first and second meanders. At run time, this phase difference would be subtracted from the measured phase difference when calculating the strain exerted on the subject object.

As an alternative to integrating the first and second meanders into the same structure, first and second pre-formed optical meander structures could be used for the modulated optical strain-sensing signal and for the modulated optical reference signal, respectively. For example, first and second meander structures that are identical to the meander structure 1 shown in FIGS. 1A-1F could be used for guiding the modulated optical strain-sensing signal and the modulated optical reference signal, respectively. In this case, the splitter would typically be located upstream of the input facets of the first and second meander structures and optically coupled to the input facets (e.g., by optical fibers or by refractive, diffractive and/or reflective optical elements) of the meander structures. The first meander structure will be secured to, or mechanically coupled to, the subject object in such a way that strain in the subject object is transferred into the first meander structure, whereas the second meander structure will be mechanically decoupled from the subject object such that strain in the subject object is not transferred into the second meander structure.

Integrating an optical splitter into the pre-formed meander structure eliminates the possibility that the optical fiber (not shown) that carries the modulated optical strain-sensing signal to the meander structure from the modulated light source of the strain gauge system will introduce a phase error that may result in an inaccurate phase difference calculation. In addition, optoelectronic transmitter and receiver elements (not shown) for generating the modulated optical signal at the input of the meander structure and for detecting the modulated optical signal at the output of the meander structure, respectively, may be incorporated into respective sockets (not shown) integrally formed in the meander structure 1. In such a case, the sockets replace the connectors 2a and 2b and are configured to mate with respective plugs of respective electrical cables (not shown).

The optoelectronic transmitter element receives an electrical modulation signal from a signal generator of the strain gauge system and converts it into a modulated optical signal. The splitter then splits the modulated optical signal into first and second modulated optical signals corresponding to the modulated optical strain-sensing signal and the modulated optical reference signal, respectively. The modulated optical strain-sensing signal and the modulated optical reference signal are then coupled into the first and second meanders of the single pre-formed optical meander structure, as described above.

An optical splitter may be integrated into the pre-formed meander structure 1 to provide Rosette functionality. In other words, a single pre-formed meander structure having N+1 meanders, where N is a positive integer that is greater than or equal to 2. One of the meanders would carry the modulated optical reference signal and the other N meanders would carry N respective modulated optical strain-sensing signals. The N meanders are mechanically coupled to the object structure in one of several particular Rosette configurations, including, for example, a Tee Rosette configuration, a 45°-Rectangular Rosette configuration, a 60°-Delta Rosette configuration, and a Stacked-Rectangular Rosette configuration. Strain or stress in the subject object is transferred into the N meanders forming the Rosette configuration. The reference signal meander is not mechanically coupled to the subject object and therefore is not affected by strain or stress in the subject object.

The splitter splits a modulated optical signal into N modulated optical strain-sensing signals and directs them into the N meanders. The strain gauge system then determines phase differences between each of the N modulated optical strain-sensing signals and the modulated optical reference signal to obtain N phase differences. The strain gauge system then calculates N strain measurements based on the N phase differences, respectively.

As another option, an optical transceiver (not shown) may be embedded in the pre-formed meander structure 1, in which case the electrical modulation signal that drives the optoelectronic transmitter element (e.g., an LED or laser diode) of the transceiver is delivered from the strain gauge system to the transceiver embedded in the meander structure 1. The electrical sense signal that is generated by the optoelectronic receiver element (e.g., a photodiode) of the transceiver is outputted from the transceiver and delivered over the electrical cable or over a different electrical cable to the strain gauge system.

The pre-formed meander structure 1 may be coated with various coating materials in order to alter the mechanical and/or optical responses of the structure 1. A variety of coating processes may be used for this purpose, including, for example, physical vapor deposition (PVD), chemical vapor deposition (CVD) and/or electroplating. Such processes have traditionally not been used with POFs due to being incompatible with the POF manufacturing process. Any suitable process for applying a coating to the meander structure 1 may be used. Coating materials that may be used include, for example, metallic coatings such as gold, silver, gold alloys, and silver alloys, and dielectric coatings such as silicon nitride, silicon dioxide, titanium nitride, and titanium dioxide.

The coatings may be applied to form stacked layers that comprise a diffractive Bragg grating (DBG) on the meander structure 1. DBGs may be used as mirrors to prevent light from escaping from the light-guiding portions 1a, 1b and 1c of the meander structure. Various coatings may be applied to alter the mechanical response of the meander structure 1, such as to increase or decrease the stiffness of the meander structure 1. Coatings may also be applied to create a graded index of refraction of the portions 1a, 1b and 1c of the pre-formed structure 1, thereby altering the optical characteristics of the structure 1. The invention is not limited with respect to the types of coatings that can be applied or with respect to the purpose for which the coating is applied.

The pre-formed meander structure 1 may be secured directly to the subject object, in which case the pre-formed meander structure 1 comprises the entire strain gauge. Alternatively, the pre-formed meander structure 1 may be secured to a base or pad made of cured bulk matrix material that is secured to the subject object, in which case the pad having the pre-formed meander structure secured thereto comprises the strain gauge. In the former case, strain in the subject object is transferred directly into the meander structure 1. In the latter case, strain is transferred from the subject object into the base and then from the base into the meander structure 1. This latter case will now be described with reference to FIGS. 3A-3C.

Figure 3A:
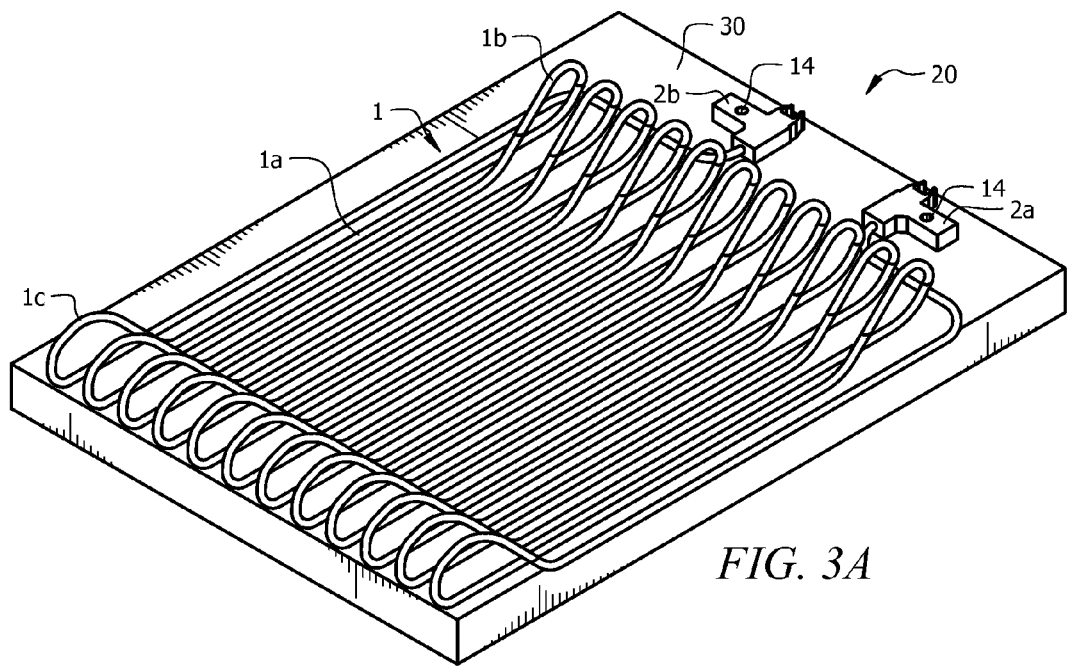
FIGS. 3A-3C illustrate, respectively, top perspective, back end elevation and front end elevation views of a strain gauge in accordance with an illustrative embodiment comprising the pre-formed meander structure shown in FIGS. 1A-1C embedded in a bulk matrix material.
Figure 3B:
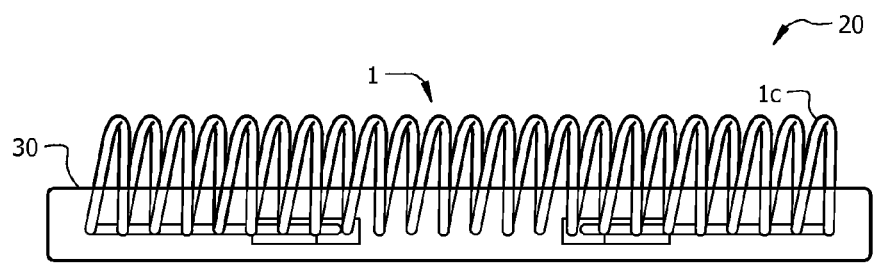
Figure 3C:
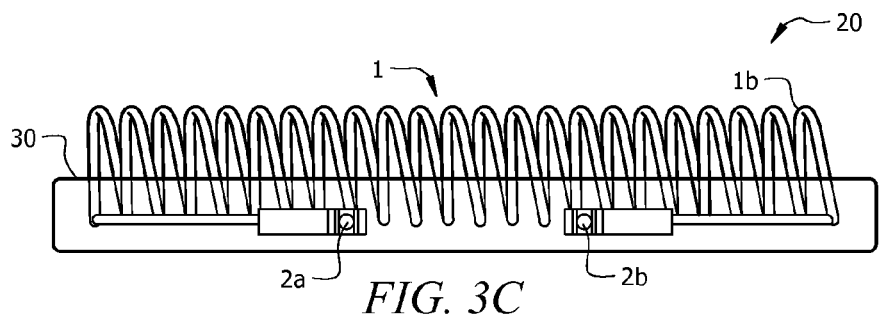
Figure 4A:
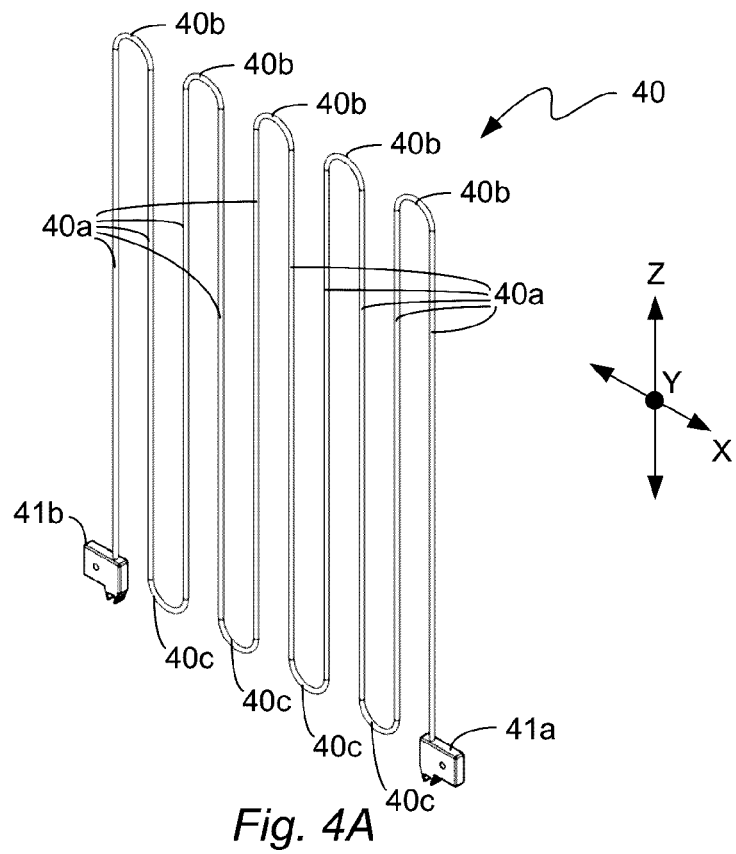
FIGS. 4A-4D illustrate, respectively, perspective, front elevation, top elevation and side elevation views of a two-dimensional (2-D) pre-formed meander structure in accordance with an illustrative embodiment.
Figure 4B:
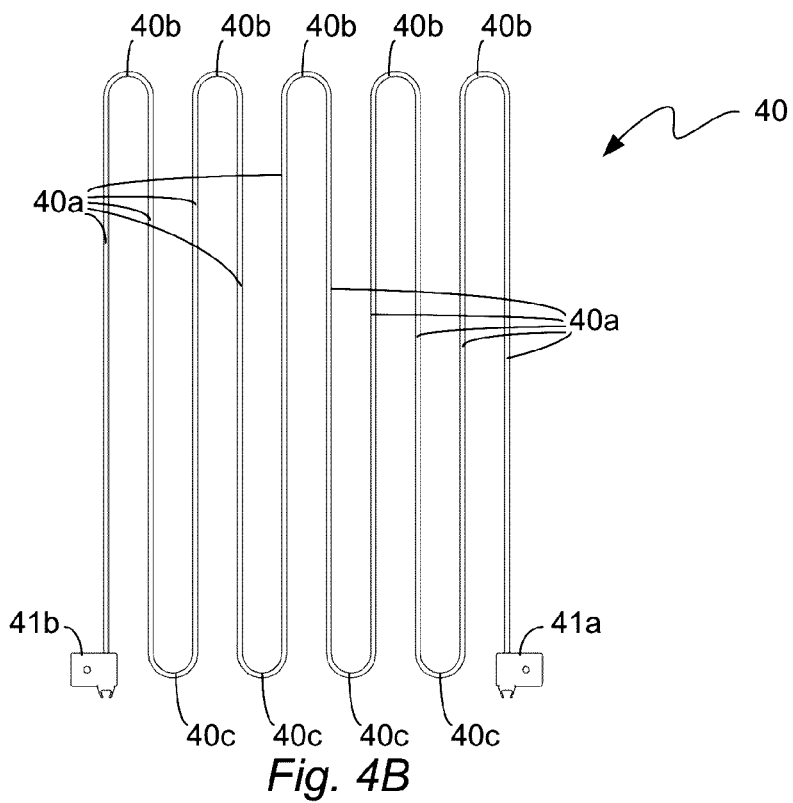
Figure 4C:
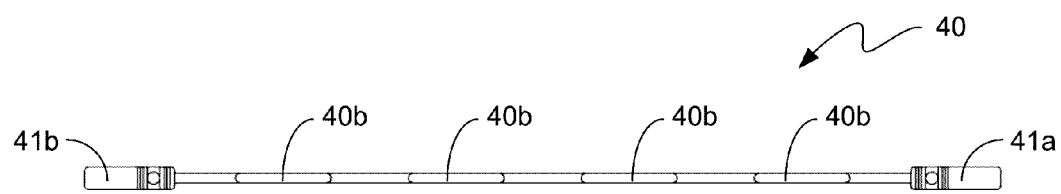
Figure 4D:
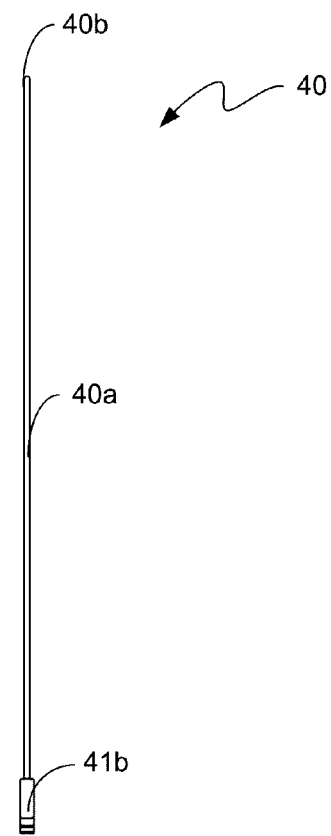

FIGS. 3A-3C illustrate, respectively, top perspective, back end elevation and front end elevation views of a strain gauge 20 in accordance with an illustrative embodiment comprising the pre-formed meander structure 1 shown in FIGS. 1A-1C embedded in a bulk matrix material 30, which acts as a base or pad of the strain gauge 20. In accordance with this embodiment, all portions of the pre-formed meander structure 1 other than the first and second loop light-guiding portions 1b and 1c are encapsulated in the bulk matrix material comprising the base 30.

Figure 5:
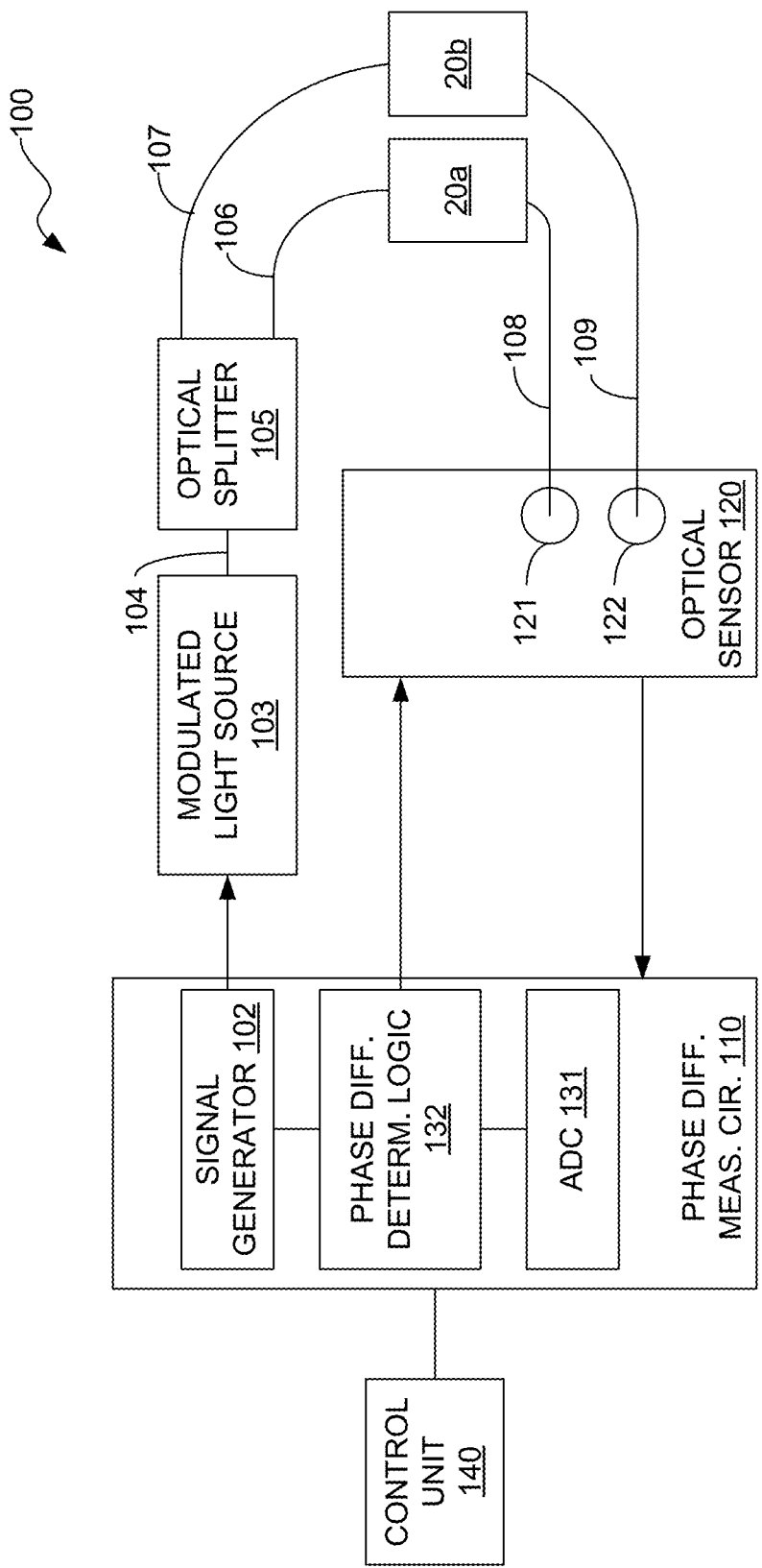
FIG. 5 illustrates the strain gauge system in accordance with an illustrative embodiment that incorporates the pre-formed optical meander structure.

The strain gauge 20 may be secured to a subject object (not shown) by passing fastening devices such as screws through the thru-holes 14 formed in the connectors 2a and 2b and securing the fastening devices to the subject object. Other types of fastening devices may be used for this purpose, such as adhesive or epoxy, for example. When the strain gauge is secured, or otherwise mechanically coupled to the subject object, strain or stress in the subject object is transferred into the base 30 and from the base 30 into the straight light-guiding portions 1a and 1b of the pre-formed meander structure 1. It should be noted that although two pre-formed optical meander structures 20a and 20b are shown in FIG. 5, a single pre-formed optical meander structure having first and second meanders for guiding the modulated optical reference signal and the modulated optical strain-sensing signal, respectively, could instead be used, as described previously. Also, if a single pre-formed optical meander structure is used, the optical splitter 105 shown in FIG. 5 could be disposed inside of the input facet of the meander structure (e.g., location 1d in FIG. 1A).

FIGS. 4A-4D illustrate, respectively, perspective, front elevation, top elevation and side elevation views of a two-dimensional (2-D) pre-formed meander structure 40 in accordance with an illustrative embodiment. The meander structure 40 lies in an the X-Z plane of an X,Y,Z Cartesian coordinate system. Like the pre-formed meander structure 1 shown in FIGS. 1A-1C, the pre-formed meander structure 40 is made up of straight light-guiding portions 40a and loop light-guiding portions 40b and 40c. Unlike, the pre-formed meander structure 1 shown in FIGS. 1A-1C, the straight light-guiding portions 40a and the loop light-guiding portions 40b and 40c are in a strain-sensing plane, which is the X-Z plane. If higher sensitivity or higher measurement resolution is not needed for the particular application, or if the particular application does not require a very compact meander structure, then it is not necessary to position the loop light-guiding portions 40b and 40c outside of the strain-sensing plane to enable the straight light-guiding portions 40a to be positioned closer together or more densely packed in the meander structure 40. In all other respects, the pre-formed meander structure 40 may have the same physical and optical characteristics and operate in the same manner as the pre-formed meander structure 1 shown in FIGS. 1A-1C.

FIG. 5 illustrates the strain gauge system 100 in accordance with an illustrative embodiment that incorporates the pre-formed optical meander structure. A phase difference measurement circuit 110 of the system 100 includes a signal generator 102 for generating an electrical modulated drive signal that drives a light source 103. The light source 103 is typically an LED, but may instead be a laser diode or some other type of light source. The light source 103 generates a chopped optical signal of a particular frequency, $f_{MOD}$. The chopped optical signal is transmitted either in free space or over an optical fiber 104 to an optical splitter 105. The optical splitter 105 receives the chopped optical signal of frequency $f_{MOD}$ and splits the optical signal into first and second optical signals of frequency $f_{MOD}$. One of these signals will be referred to as the modulated modulated optical reference signal and the other will be referred to herein as the modulated optical strain-sensing signal.

The modulated optical reference signal and the modulated optical strain-sensing signal are optically coupled by the splitter 105 into first ends of first and second optical fibers 106 and 107, respectively. Second ends of the first and second fibers 106 and 107 are connected to input facets of first and second optical strain gauges 20a and 20b, which may be identical to the optical strain gauge 20 shown in FIGS. 1A-1C. Strain gauge 20b is mechanically coupled to the subject object, but strain gauge 20a is mechanically decoupled from the subject object. The fibers 106 and 107 are typically plastic fibers, but they may be glass fibers. The connectors 2a and 2b shown in FIGS. 1A-3C may be used to connect the second ends of the fibers 106 and 107 to the input facets of the strain gauges 20a and 20b. First ends of fibers 108 and 109 are connected to output facets of the strain gauges and second ends of the fibers 108 and 109 are connected to an optical sensor 120 comprising at least two photosensors 121 and 122, which may be any suitable optical detectors. The connectors 2a and 2b shown in FIGS. 1A-3C may be used to connect the first ends of the fibers 108 and 109 to the strain gauges 20a and 20b.

The optical sensor 120 may be, for example, a 3-D pixel sensor formed in an integrated circuit (IC) die that contains a large number of the 3-D pixels 121 and 122. Each of the pixels 121 and 122 includes one or more photodiodes (not shown), integrators (not shown) and switching transistors (not shown) for converting the respective optical signal into a respective electrical photocurrent signal and integrating the photocurrent signal. The results of the integration for each of the pixels 121 and 122 are output from the sensor 120 to the phase difference measurement circuit 110. An analog-to-digital converter (ADC) 131 of the phase difference measurement circuit 110 converts the analog results into digital values and outputs the digital values to phase difference determination logic 132 of the phase difference measurement circuit 130.

The phase difference determination logic 132 uses the digital values corresponding to the outputs of pixels 121 and 122 to determine the phase difference between the modulated optical reference signal and the modulated optical strain-sensing signal. A controller 140 performs an algorithm that processes the phase difference to determine stress or strain sensed by the strain gauge 20b.

Various algorithms such as, for example, cross-correlation algorithms and Time-of-Flight (ToF) algorithms may be used to process the phase difference to determine stress or strain sensed by the strain gauge 20b. The invention is not limited with respect to the manner in which the phase difference is processed to make this determination or with respect to the strain gauge system configuration. The strain gauge system 100 shown in FIG. 5 is merely one example of a suitable system for this purpose, as will be understood by persons of skill in the art in view of the description being provided herein.

It should be noted that although two pre-formed optical meander structures 20a and 20b are shown in FIG. 5, a single pre-formed optical meander structure having first and second meanders for guiding the modulated optical reference signal and the modulated optical strain-sensing signal, respectively, could instead be used, as described previously. Also, if a single pre-formed optical meander structure is used, the optical splitter 105 could be disposed inside of the input facet of the meander structure (e.g., location 1d in FIG. 1A).

Figure 6:
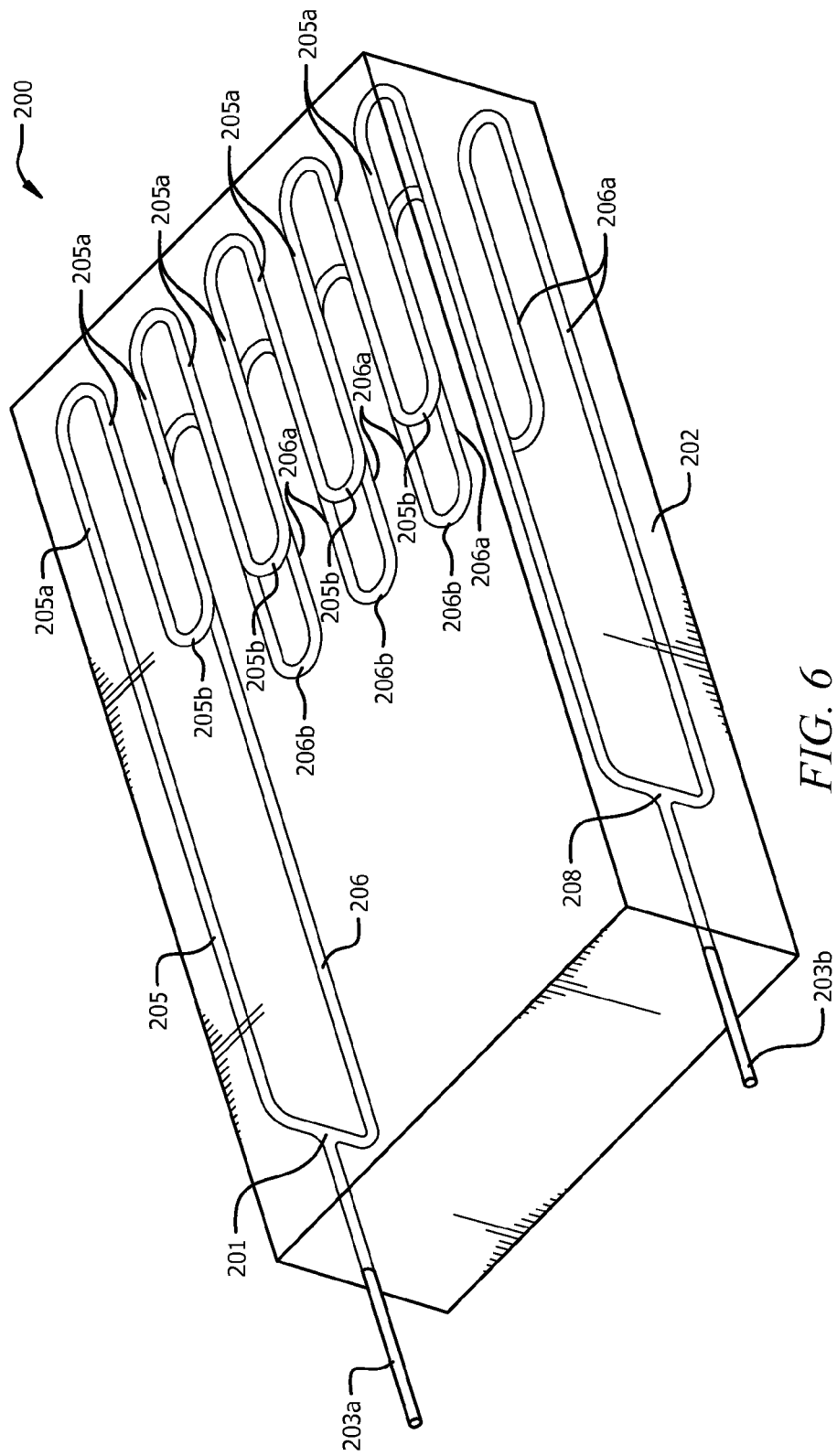
FIG. 6 illustrates a perspective view of a pre-formed optical meander structure in accordance with another illustrative embodiment in which an optical splitter is integrated into the meander structure.

FIG. 6 illustrates a perspective view of a pre-formed optical meander structure 200 in accordance with another illustrative embodiment in which an optical splitter 201 is integrated into the meander structure 200. The meander structure 200 is embedded in, or formed in, a bulk material 202 that is transparent to the operating wavelength of light or a range of operating wavelengths of light. In accordance with this illustrative embodiment, the meander structure 200 has a single input facet 203a and a single output facet 203b. A modulated optical signal is inputted to the meander structure 200 via the input facet 203a. The splitter 201 splits the inputted modulated optical signal into a modulated optical strain-sensing signal and a modulated optical reference signal. The splitter 201 directs the strain-sensing signal and the reference signal onto light guides 205 and 206, respectively. Light guide 205 comprises a plurality of straight light-guiding portions 205a and a plurality of loop light-guiding portions 205b. Likewise, light guide 206 comprises a plurality of straight light-guiding portions 206a and a plurality of loop light-guiding portions 206b. The loop light-guiding portions 205b and 206b interconnect the straight light-guiding portions 205a and 206a, respectively.

The light guides 205 and 206 are joined at an optical combiner 208. The optical combiner 208 combines the strain-sensing signal and the reference signal and directs the combined optical signal onto output facet 203b. The combined optical signal is then sent to a strain-gauge system such as system 100 shown in FIG. 5, which processes the combined signal to determine the phase difference between the phases of the strain-sensing signal and reference signal. The system then calculates a strain measurement based on the phase difference.

In the embodiment shown in FIG. 6, the light guides 205 and 206 have different lengths to create a phase shift (e.g., a 90° phase shift) between the strain-sensing signal and the reference signal at the output facet 203b. A decoupling layer (not shown) may be disposed in between the light guides 205 and 206 in order to mechanically decouple light guide 206 from light guide 205 so that strain in the subject object does not affect the phase of the reference signal, although it is not necessary in all cases to decouple the light guides 205 and 206 from one another.

Figure 7:
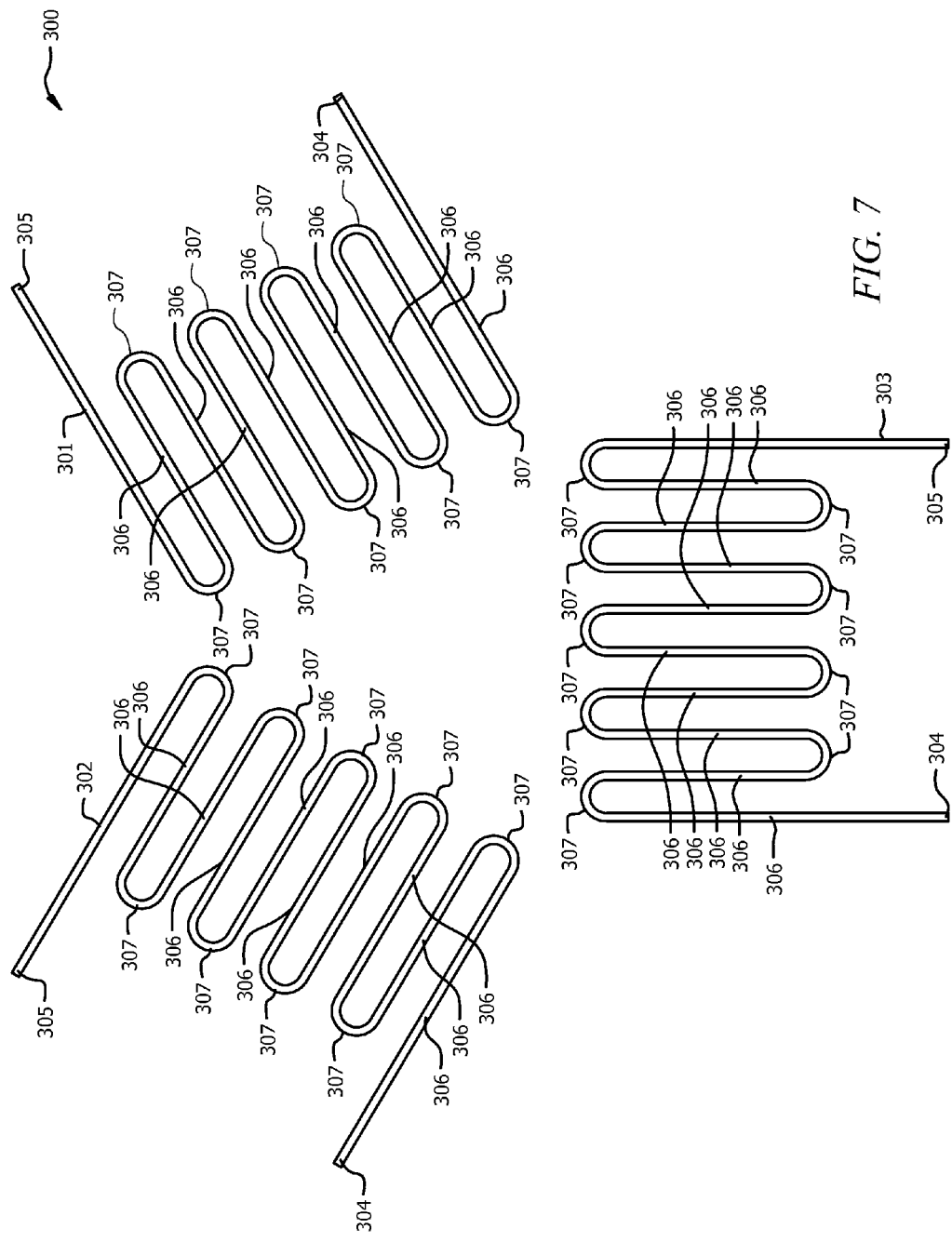
FIG. 7 illustrates an elevation view of a pre-formed Rosette strain gauge that may be embedded in or attached to a subject object for measuring strain in the subject object.

FIG. 7 illustrates an elevation view of a pre-formed Rosette strain gauge 300 that may be embedded in or attached to a subject object (not shown) for measuring strain in the subject object. Alternatively, the Rosette strain gauge 300 may be embedded in or formed in a bulk material, such as one of the bulk materials described above, in which case the bulk material would be attached to or embedded in the subject object. The strain gauge 300 comprises three meanders 301, 302 and 303, each of which has an input facet 304, an output facet 305, a plurality of straight light-guiding portions 306 and a plurality of loop light-guiding portions 307. An optical splitter (not shown) that may be integrated into the pre-formed Rosette strain gauge splits a modulated optical signal into first and second modulated optical strain-sensing signals and a modulated optical reference signal and directs the signals into the respective input facets 304. For demonstrative purposes, it will be assumed that the first and second strain-sensing signals are coupled into meanders 301 and 302 and that the reference signal is coupled into meander 303.

Strain or stress in the subject object is transferred into the meanders 301 and 302. The strain-sensing signals that are output from output facets 305 of meanders 301 and 302 and the reference signal output from output facet 305 of meander 303 are processed in the manner described above to determine the phase differences and the corresponding strain in multiple directions. The manner in which the signals that are ouputted from a Rosette strain gauge may be processed to determine the strain in multiple directions is known, and therefore will not be further described herein in the interest of brevity.

It should be noted that embodiments have been described herein for the purpose of demonstrating the principles and concepts of the invention. As will be understood by persons skilled in the art in view of the description being provided herein, the invention is not limited to these embodiments. For example, while the optical strain gauges have been described for exemplary purposes as having particular configurations, the optical strain gauges can have many other configurations within the scope of the invention. Also, variations can be made to the strain gauge configurations described herein without deviating from the principles and concepts of the invention. Persons of skill in the art will understand that these and other modifications may be made to the embodiments described herein without deviating from the principles and concepts of the invention and that all such modifications are within the scope of the invention.

What is claimed is:

1. A device, comprising:
a pre-formed optical meander structure, the pre-formed optical meander structure comprising at least a first end, a second end and a first light guide extending from the first end of the meander structure to the second end of the meander structure, the first light guide having a first end and a second end and having a plurality of light-guiding portions connected end-to-end in a predetermined configuration; and
a fastening device configured for fastening the pre-formed optical meander structure to the subject so as to sense strain in the subject object.

2. The device of claim 1, wherein the light-guiding portions include at least a plurality of straight light-guiding portions and a plurality of loop light-guiding portions, wherein the loop light-guiding portions interconnect the straight light-guiding portions with one another, and wherein the pre-formed optical meander structure is made of a material that has characteristics of stiffness and flexibility that allow the straight light-guiding portions to deform by an amount that depends on an amount of strain placed on the straight light-guiding portions by the subject object and to return to original shapes of the straight light-guiding portions when the strain is not present.

3. The device of claim 2, wherein the straight and loop light-guiding portions lie in a strain-sensing plane that is parallel to an X-Y plane of an X, Y, Z Cartesian coordinate system.

4. A pre-formed optical meander structure for use as an optical strain gauge in an optical strain gauge system for sensing strain in a subject object, the pre-formed optical meander structure being configured to being fastened to the subject object and comprising at least a first end, a second end and a first light guide extending from the first end of the meander structure to the second end of meander structure, the first light guide having a first end and a second end and having plurality of light-guiding portions connected end-to-end in a predetermined configuration, wherein the light-guiding portions include at least a plurality of straight light-guiding portions and a plurality of loop light-guiding portions, wherein the loop light-guiding portions interconnect the straight light-guiding portions with one another, wherein the straight light-guiding portions lie in a strain-sensing plane that is parallel to an X-Y plane of an X, Y, Z Cartesian coordinate system and wherein the loop light-guiding portions lie in a plane that is outside of the strain-sensing plane.

5. The pre-formed optical meander structure of claim 4, wherein the loop light-guiding portions lie in an X-Z plane of the X, Y, Z Cartesian coordinate system that is orthogonal to the X-Y plane.

6. The device of claim 1, wherein the pre-formed optical meander structure is a molded structure.

7. The device of claim 1, wherein the pre-formed optical meander structure is a cast structure.

8. The device of claim 1, wherein the pre-formed optical meander structure is a three-dimensional (3-D) printed structure.

9. The device of claim 1, wherein the pre-formed optical meander structure is a milled structure.

10. The device of claim 1, further comprising a coating material coating the pre-formed optical meander structure.

11. The device of claim 1, further including stacked layers comprising a diffractive Bragg grating formed on the pre-formed optical meander structure.

12. The device of claim 10, wherein the coating material forms a graded refractive index on the pre-formed optical meander structure.

13. The device of claim 1, further comprising:
a first connector secured to the first end of the pre-formed optical meander structure for coupling a modulated optical signal of a first wavelength into the first light guide of the pre-formed optical meander structure, the first connector being configured to mate with a plug disposed on a first end of a first optical fiber cable; and a second connector secured to the second end of the pre-formed meander structure for coupling the modulated optical signal of the first wavelength out of the pre-formed optical meander structure, the second connector being configured to mate with a plug disposed on a first end of a second optical fiber cable.

14. The device of claim 1, further comprising: a second light guide having a first end and a second end and having a second plurality of light-guiding portions connected end-to-end in a predetermined configuration.

15. The device of claim 14, further comprising:

an optical splitter disposed in the first end of the pre-formed optical meander structure, the optical splitter being configured to split a modulated optical signal of a first wavelength into a modulated optical reference signal and a modulated optical strain-sensing signal, and wherein the modulated optical reference signal passes through the first end of the second light guide into the second light guide, and wherein the modulated optical strain-sensing signal passes through the first end of the first light guide into the first light guide, and wherein the modulated optical reference signal travels through the second light guide and passes out of the second light guide through the second end of the second light guide, and wherein the modulated optical strain-sensing signal travels through the first light guide and passes out of the first light guide through the second end of the first light guide.

16. The device of claim 1, further comprising:

an optoelectronic transmitter element disposed in the first end of the pre-formed optical meander structure for receiving a modulated electrical signal and converting the modulated electrical signal into a modulated optical signal of a first wavelength; and an optoelectronic receiver element disposed in the second end of the pre-formed optical meander structure for receiving the modulated optical signal of the first wavelength and converting the modulated electrical signal into an electrical signal.

17. A method for sensing strain in a subject object comprising:

producing a pre-formed optical meander structure comprising at least a first end, a second end and a first light guide extending from the first end to the second end, the first light guide having a first end and a second end and having a plurality of light-guiding portions connected end-to-end in a predetermined configuration;

fastening the pre-formed optical meander structure to a subject as a strain gauge for the subject object;

coupling a modulated optical strain-sensing signal of a first wavelength into a first end of the first light guide, the modulated optical strain-sensing signal traveling through the first light guide to a second end of the first light guide and passing out of the first light guide through the second end of the first light guide;

coupling a modulated optical reference signal of the first wavelength into a first end of a second light guide, the modulated optical strain-sensing signal traveling through the second light guide and passing out of the second light guide through a second end of the second light guide;

receiving the first modulated optical strain-sensing signal passing out of the second end of the first light guide and converting the modulated optical strain-sensing signal into a first electrical signal;

receiving the first modulated optical reference signal passing out of the second end of the second light guide and converting the modulated optical reference signal into a second electrical signal;

determining a phase difference between the first and second electrical signals; and based on the phase difference, determining a first amount of strain on the subject object sensed by the strain gauge.

18. The method of claim 17, wherein the light-guiding portions include at least a plurality of straight light-guiding portions and a plurality of loop light-guiding portions, wherein the loop light-guiding portions interconnect the straight light-guiding portions with one another, and wherein the structure is made of a material that has characteristics of stiffness and flexibility that allow the straight light-guiding portions to deform by an amount that depends on an amount of strain placed on the straight light-guiding portions by the subject object and to return to original shapes of the straight light-guiding portions when the strain is not present.

19. The method of claim 17, wherein the straight and loop light-guiding portions lie in a strain-sensing plane that is parallel to an X-Y plane of an X, Y, Z Cartesian coordinate system.

20. The method of claim 17, wherein the straight light-guiding portions lie in a strain-sensing plane that is parallel to an X-Y plane of an X, Y, Z Cartesian coordinate system and wherein the loop light-guiding portions lie in a plane that is outside of the strain-sensing plane.

21. The method of claim 20, wherein the loop light-guiding portions lie in an X-Z plane of the X, Y, Z Cartesian coordinate system that is orthogonal to the X-Y plane.

22. The method of claim 17, wherein the pre-formed optical meander structure further comprises an optical splitter, and wherein the second light guide is formed in the pre-formed optical meander structure, the method further comprising:

with the splitter, splitting a modulated optical signal of the first wavelength into the modulated optical reference signal and the modulated optical strain-sensing signal and optically coupling the modulated optical strain-sensing signal and the modulated optical reference signal into the first ends of the first and second light guides, respectively.

23. The device of claim 1, wherein the pre-formed optical meander structure is not embedded in any bulk material.

24. The device of claim 13, wherein at least one of the first and second connectors includes the fastening device for fastening the pre-formed optical meander structure to the subject object.

25. The method of claim 17, wherein the pre-formed optical meander structure is not embedded in any bulk material.

26. The method of claim 17, wherein fastening the pre-formed optical meander structure to a subject object comprises:

fastening the preformed optical meander structure to a base structure comprising a bulk matrix material, and fastening the base structure to the subject object.

* * * * *